United States Patent
Yu et al.

(10) Patent No.: US 12,056,431 B2
(45) Date of Patent: Aug. 6, 2024

(54) METHODS OF PREPARING PHOTO MASK DATA AND MANUFACTURING A PHOTO MASK

(71) Applicant: TAIWAN SEMICONDUCTOR MANUFACTURING COMPANY, LTD., Hsinchu (TW)

(72) Inventors: Zhiru Yu, San Jose, CA (US); Yan Feng, Hsinchu (TW); Lin Zhang, Hsinchu (TW); Danping Peng, Fremont, CA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 190 days.

(21) Appl. No.: 17/462,832

(22) Filed: Aug. 31, 2021

(65) Prior Publication Data

US 2023/0066219 A1 Mar. 2, 2023

(51) Int. Cl.
*G06F 30/27* (2020.01)
*G03F 1/36* (2012.01)
(Continued)

(52) U.S. Cl.
CPC .............. *G06F 30/398* (2020.01); *G03F 1/36* (2013.01); *G06F 30/27* (2020.01); *G06F 2119/18* (2020.01)

(58) Field of Classification Search
None
See application file for complete search history.

(56) References Cited

U.S. PATENT DOCUMENTS 8,796,666 B1 8/2014 Huang et al.
8,954,899 B2 2/2015 Wu et al.
(Continued)

FOREIGN PATENT DOCUMENTS

WO WO-2021032448 A1 * 2/2021 ............. G03F 7/705

OTHER PUBLICATIONS

A. Zepka et al., "Mask Modeling using a Deep Learning Approach," Proc. SPIE vol. 11148, Photomask Technology, Sep. 26, 2019, SPIE Photomask Technology + EUV Lithography, 11 pages. (Year: 2019).*
(Continued)

*Primary Examiner* — Leigh M Garbowski
(74) *Attorney, Agent, or Firm* — STUDEBAKER & BRACKETT PC

(57) ABSTRACT

In a method of manufacturing a lithographic mask of an integrated circuit for semiconductor device manufacturing an optical proximity correction (OPC) process to a layout pattern of the integrated circuit is performed to produce a corrected layout pattern. An inverse lithographic technology (ILT) process to the corrected layout pattern is also performed to enhance the corrected layout pattern to produce an OPC-ILT-enhanced layout pattern of the lithographic mask. A first contour image associated with the OPC-ILT-enhanced layout pattern is generated when the OPC-ILT-enhanced layout pattern of the lithographic mask is projected on a wafer. The features of the generated first contour image are extracted. And a second contour image of a developed photo resist pattern on the wafer associated with the OPC-ILT-enhanced layout pattern as an output of a deep neural network is generated.

20 Claims, 16 Drawing Sheets

(51) Int. Cl.
*G06F 30/30* (2020.01)
*G06F 30/398* (2020.01)
*G06F 119/18* (2020.01)

(56) References Cited

U.S. PATENT DOCUMENTS

| | | | |
|---|---|---|---|
| 9,093,530 | B2 | 7/2015 | Huang et al. |
| 9,134,633 | B2 | 9/2015 | Lin et al. |
| 9,230,867 | B2 | 1/2016 | Cheng et al. |
| 9,304,403 | B2 | 4/2016 | Lin et al. |
| 9,367,655 | B2 | 6/2016 | Shih et al. |
| 9,390,217 | B2 | 7/2016 | Wang et al. |
| 9,404,743 | B2 | 8/2016 | Chiu et al. |
| 9,548,303 | B2 | 1/2017 | Lee et al. |
| 9,594,862 | B2 | 3/2017 | Lin et al. |
| 9,679,100 | B2 | 6/2017 | Cheng et al. |
| 9,823,585 | B2 | 11/2017 | Shih et al. |
| 9,841,687 | B2 | 12/2017 | Lee et al. |
| 9,859,139 | B2 | 1/2018 | Cheng et al. |
| 9,865,542 | B2 | 1/2018 | Liaw et al. |
| 9,870,443 | B2 | 1/2018 | Huang et al. |
| 11,092,899 | B2 * | 8/2021 | Huang ............... G06F 30/398 |
| 2020/0174380 | A1 * | 6/2020 | Huang ............... G03F 7/70441 |
| 2021/0064977 | A1 * | 3/2021 | Cecil ................. G06F 30/27 |
| 2021/0373443 | A1 * | 12/2021 | Huang ............... G06F 30/392 |
| 2022/0299881 | A1 * | 9/2022 | Zheng ............... G03F 7/70625 |
| 2022/0327364 | A1 * | 10/2022 | Hunsche ............ G03F 1/36 |
| 2023/0037918 | A1 * | 2/2023 | Pang ................. G06T 7/70 |
| 2023/0064987 | A1 * | 3/2023 | Akkiraju .......... G05B 19/40931 |

OTHER PUBLICATIONS

K. Hooker et al., "Using Machine Learning Etch Models in OPC and ILT Correction," Proc. SPIE vol. 11614, Design-Process-Technology Co-optimization XV, Apr. 13, 2021, SPIE Advanced Lithography, 9 pa (Year: 2021).*

* cited by examiner

METHODS OF PREPARING PHOTO MASK DATA AND MANUFACTURING A PHOTO MASK

BACKGROUND

During an integrated circuit (IC) design, a number of patterns of the IC, for different steps of IC processing, are generated on a substrate. The patterns include geometric shapes corresponding to structures to be fabricated on the substrate. The geometric shapes may be projected from a photo mask onto a photo resist layer on the substrate. The photo resist layer is developed to produce the patterns on the photo resist layer. Therefore, it is desirable to determine that the projection and development of the layout pattern produces the desired geometric shapes of the photo mask.

BRIEF DESCRIPTION OF THE DRAWING

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1A:
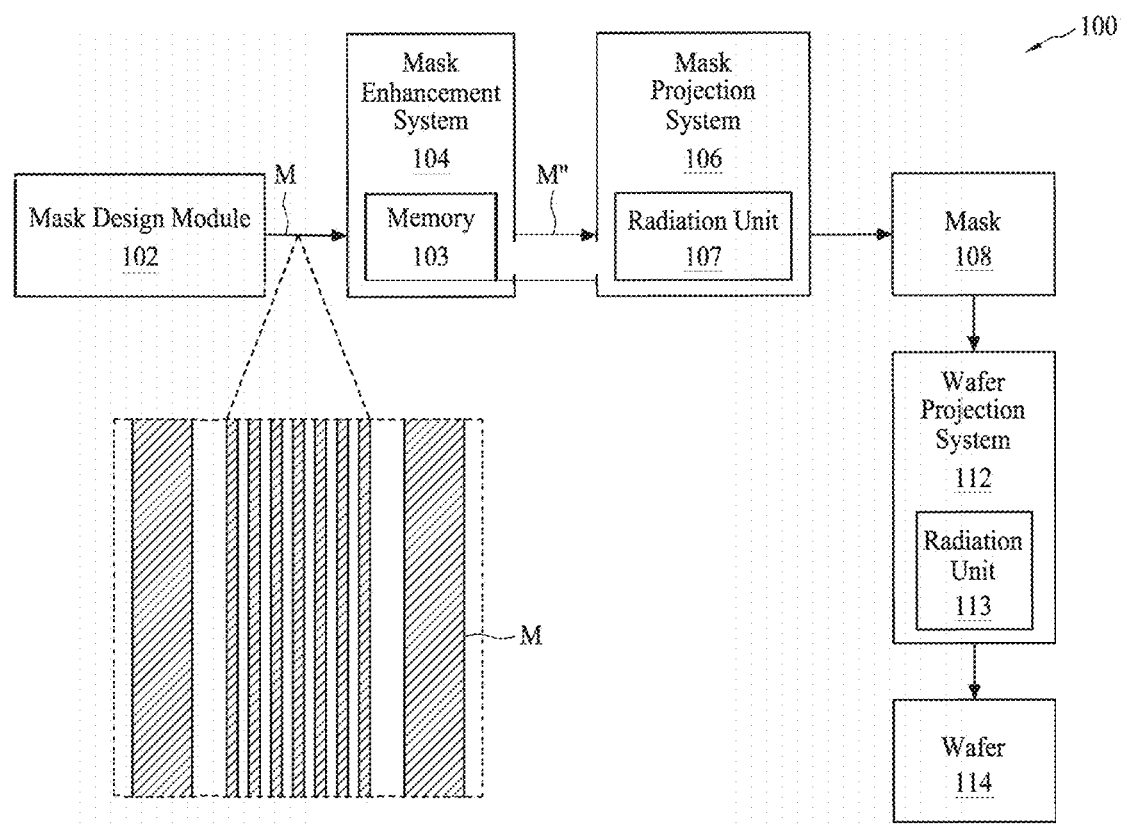
FIGS. 1A and 1B illustrate a schematic diagram of an integrated circuit fabrication flow and a wafer enhancement system of the integrated circuit fabrication flow.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In addition, the term "being made of" may mean either "comprising" or "consisting of." In the present disclosure, a phrase "one of A, B and C" means "A, B and/or C" (A, B, C, A and B, A and C, B and C, or A, B and C), and does not mean one element from A, one element from B and one element from C, unless otherwise described.

In IC design, lithography simulation is used to predict resist pattern shapes on a wafer produced from a layout pattern of the photo mask, e.g., in a resist layer on the wafer. Such simulations can be used, for example, to assess the quality of the images, to discover defects, or to perform corrections of the layout pattern of the photo mask using an optical proximity correction (OPC). The OPC is used to achieve images, e.g., projections, close to a target layout pattern, by optimizing the printing parameters such as the illumination source, or optimizing the source and the photo mask to achieve better printability. The evaluation of the layout pattern can include identifying areas of the photo mask that may produce defects, e.g., pattern bridges where two neighboring separate features become attached, pattern pinches where a connected feature becomes disconnected and/or gets defective shapes, in the resist pattern on the wafer.

It is more challenging to form a layout pattern for ICs having smaller feature sizes. The proximity of the layout features for smaller feature sizes may cause optical distortion when imaged on the wafer. Image features whose size and/or separation approaches the resolution limit of the lithography system, e.g., resolution limit of the radiation source or the exposure device, are thus subject to distortion. In some embodiments, the proximity effect can be compensated for, at least in part, by modifying any given feature in the opposite direction to the expected distortion.

An OPC process is one lithography technique used to tune (e.g., correct or enhance) the layout pattern for improved imaging effect. The objective of the OPC process is to reproduce on the wafer, the target layout drawn by the IC designer. For example, OPC can be used to compensate for image errors due to optical diffraction or process effects. The OPC helps to maintain the edge of the layout pattern of the photo mask in the patterned image on the wafer. If not compensated, after processing, the images patterned on the wafer can appear with irregularities such as line widths that are narrower or wider than designed. The OPC can compensate for such irregularities by changing (e.g., correcting) the layout pattern of the photo mask. In some embodiments, a desired OPC is iteratively identified. In some embodiments, multiple OPCs are iteratively applied, the corrected layout pattern is projected on the wafer to produce the resist pattern on the wafer, and the corrected layout pattern that produces no defects is selected as having the desired OPC.

After the OPC is performed to make the adjustments to the layout pattern of the photo mask, the modified layout pattern may still be defective due to the lithography process. In some embodiments, inspection is performed to identify areas of the OPCed layout pattern that may not be properly printed as a resist pattern on the wafer and produce defective areas on the wafer, e.g., produce areas on the wafer where pinching and/or bridging occurs.

In some embodiments, after the OPC is performed, an inverse of the lithography process, e.g., an inverse lithographic technology (ILT) process is applied to the corrected layout pattern of the photo mask to remedy the remaining defective areas. In some embodiments, the ILT process is performed as an iterative process. Thus, the OPC corrected layout pattern of the photo mask is further corrected, e.g., enhanced, by applying the ILT through an iterative process. In some embodiments, the iterative process has a number of iterations and each iteration includes a projection of the corrected and enhanced layout pattern on the wafer. In some embodiments, in each iteration both the OPC and the ILT processes are simultaneously applied, the corrected and enhanced layout pattern is projected onto the wafer to produce the resist pattern, and the corrected and enhanced layout pattern that produces no defects is selected.

In some embodiments, determining the pattern projected on the resist layer of the wafer is not sufficient because when the projected pattern is developed, the pattern of the developed resist layer further changes and is not the same as the pattern projected on the resist layer. Therefore, it is desirable to find a way to determine, e.g., predict, the pattern developed in the resist layer of the wafer.

In some embodiments, the development of the resist layer, e.g., the development of the projected layout pattern of the photo mask into the resist pattern, is modeled by a machine learning method, e.g., a neural network. In some embodiments, a neural network, e.g., a deep neural network, is defined. The machine learning method is trained using a database having a collection of the projected layout patterns and corresponding developed resist patterns.

In each iteration, the corrected and enhanced layout pattern is projected onto the resist layer of the wafer and the development of the projected pattern is determined using the machine learning method to produce the resist pattern. In some embodiments, a neural network is defined and the neural network is trained offline. A first plurality of corrected and enhanced layout patterns are projected onto the resist layer to produce projected patterns and then a second plurality of contours of the projected patterns are extracted (e.g., a contour image). The neural network is trained using the second plurality of contours of the projected patterns as the input and the corresponding resist pattern developed in the resist layer or the contours of the resist pattern developed in the resist layer as the output of the neural network. In some embodiments, after being trained, the neural network is used as a part of the procedure for determining the resist pattern corresponding to a corrected and enhanced layout pattern. Thus, in some embodiments, a first group of the second plurality of contours of the projected patterns, which are not used for training the neural network, are used as an input to the trained neural network to verify the neural network. Thus, the outputs produced by the neural network in response to the first group of contours of the projected patterns is compared with the corresponding developed resist pattern or the contours of the developed resist pattern in the database to verify the accuracy of the neural network.

Figure 1B:
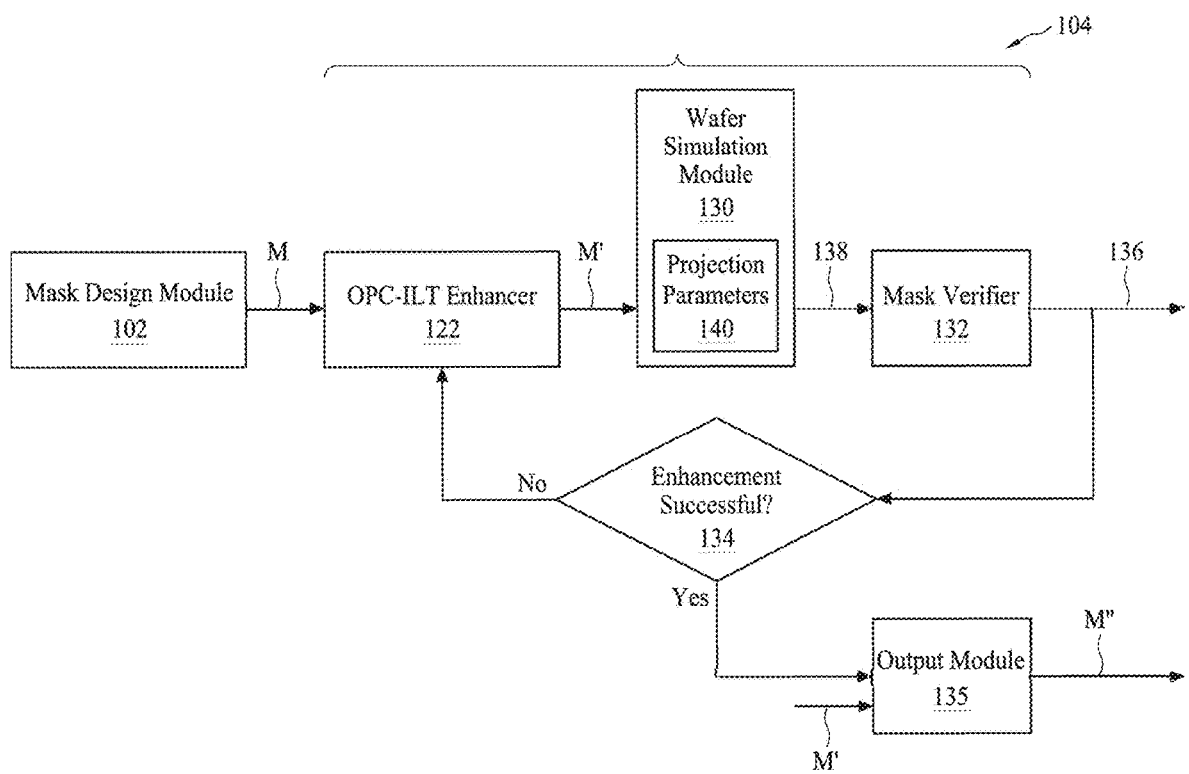

FIGS. 1A and 1B illustrate a schematic diagram of a semiconductor integrated circuit fabrication flow and a wafer enhancement system of the integrated circuit fabrication flow. FIG. 1A illustrates a schematic diagram of an integrated circuit (IC) fabrication flow 100. The IC fabrication flow 100 begins with a mask design module 102 that provides a layout pattern M for producing an IC product. The mask design module 102 creates various layout patterns, e.g., geometric shapes of target layout patterns, based on the specification of the IC product and for different processing steps for producing the IC product. In some embodiments, the layout pattern M is presented by one or more data files having the information of the layout pattern. In some embodiments, the data files are graphic design system (GDS) files. In some embodiments, the layout pattern M is created in a photo mask. The IC fabrication flow 100 includes a mask enhancement system 104, which includes a memory 103 in some embodiments. As described in more details below with respect to FIG. 1B, the mask enhancement system 104 performs OPC and ILT enhancements in some embodiments. The OPC is followed by a defect detection of the projected layout pattern and then further enhancements are applied to the layout pattern in some embodiments. The mask enhancement system 104 creates a corrected and enhanced layout pattern M", e.g., an OPC-ILT-enhanced layout pattern M". In some embodiments, the OPC-ILT-enhanced layout pattern M" is presented by one or more GDS files having the information of the corrected and enhanced layout pattern. In some embodiments, the OPC-ILT-enhanced layout pattern M" is created as a photo mask with the corrected and enhanced layout pattern on a blank mask, e.g., on a mask-blank to create a mask 108.

In some embodiments, the IC fabrication flow 100 further includes a mask projection system 106 including a radiation unit 107. In some embodiments, the mask projection system 106 produces the corrected and enhanced layout pattern M" from the data files and then projects, e.g., by an electron beam of the radiation unit 107, the corrected and enhanced layout pattern M" to the mask-blank coated with a photo resist to pattern the mask-blank and produce the mask 108. In some embodiments, the mask projection system 106 may use the data files of the corrected and enhanced layout pattern M" and projects, e.g., by an electron beam of the radiation unit 107, the corrected and enhanced layout pattern M" to a mask-blank coated with the photo resist to pattern the mask-blank and to produce the mask 108.

In some embodiments, the IC fabrication flow 100 includes a wafer projection system 112 that includes a radiation unit 113. In some embodiments, the wafer projection system 112 produces a resist pattern on a wafer from the corrected and enhanced layout pattern M" of the mask 108. The wafer projection system 112 may implement an optical projection using an extreme ultra violet (EUV) light beam of the radiation unit 113 to produce the resist pattern on a wafer 114, e.g., on a substrate. In some embodiments, the wafer projection system 112 implements an electron beam projection using an electron beam of the radiation unit 113 to produce the resist pattern on the wafer 114.

FIG. 1B illustrates a schematic process for enhancing a lithographic mask. FIG. 1B includes mask design module 102 and the mask enhancement system 104. As shown, the mask enhancement system 104 includes an OPC-ILT enhancer 122 that receives the layout pattern M produced by the mask design module 102 and produces an OPC-ILT-enhanced layout pattern M'. As described, OPC is a lithography technique that is used to correct the layout pattern M, and produce improved imaging effects to reproduce, on the wafer 114, the target layout pattern, drawn by the mask design module 102. For example, OPC can be used to compensate for imaging distortions due to optical diffraction. In some embodiments, the layout pattern M is a data file, e.g., a GDS file, having the information of the layout pattern to be produced on the wafer 114, and the OPC-ILT enhancer 122 modifies the data file and produces a corrected data file, e.g., a corrected or adjusted GDS file, representing a corrected and enhanced layout pattern M'.

The mask enhancement system 104 further includes a wafer simulation module 130 that performs a projection of the corrected and enhanced layout pattern M' to produce a projected resist pattern 138 on the wafer 114. In some embodiments, the corrected and enhanced layout pattern M' is a data file, e.g., a GDS file, and the wafer simulation module 130 calculates the projected images of the corrected and enhanced layout pattern M' on the wafer 114 and predict resist pattern 138. Although the corrected and enhanced layout pattern M' is corrected by OPC and enhanced by ILT, defective areas may be produced when the corrected and enhanced layout pattern M' is projected as the resist pattern 138 on the wafer 114. The mask enhancement system 104 further includes a mask verifier 132 that inspects the resist pattern 138 to find the defects of the resist pattern 138. In some embodiments, the mask verifier 132 generates a defect list 136 of the defects of the resist pattern 138. In some embodiments, the defect list 136 is tested at step 134 and if the defect list 136 is not empty, e.g., a defect exists in the defect list 136, the iterations continue by modifying the OPC and ILT enhancement at the OPC-ILT enhancer 122. In some embodiments, if the defect list 136 is empty, an output module 135 provides the corrected and enhanced layout pattern of the current iteration as enhanced layout pattern M" at the output of the mask enhancement system 104. In some embodiments, the OPC-ILT enhancer 122 commands the wafer simulation module 130 to set the projection parameters 140 for projecting, e.g., the simulated projection, of the corrected and enhanced layout pattern M' on the wafer 114. In some embodiments, the projection parameters 140 include a radiation energy level and wavelength and projection parameters, e.g., imaging parameters, of the wafer simulation module 130 that is used for the projection. The imaging parameters and radiation energy level may provide a depth of focus of the projection, e.g., imaging, system. In some embodiments, a defect in the resist pattern 138 is identified when a probability of the defect occurring in the resist pattern 138 is above a threshold. In some embodiments, the wafer simulation module 130 simulates, e.g., calculates, the resist pattern 138 and in some other embodiments, the wafer simulation module 130 performs the actual projection and development process of the resist layer to produce the resist pattern 138 on the wafer 114.

Figure 2A:
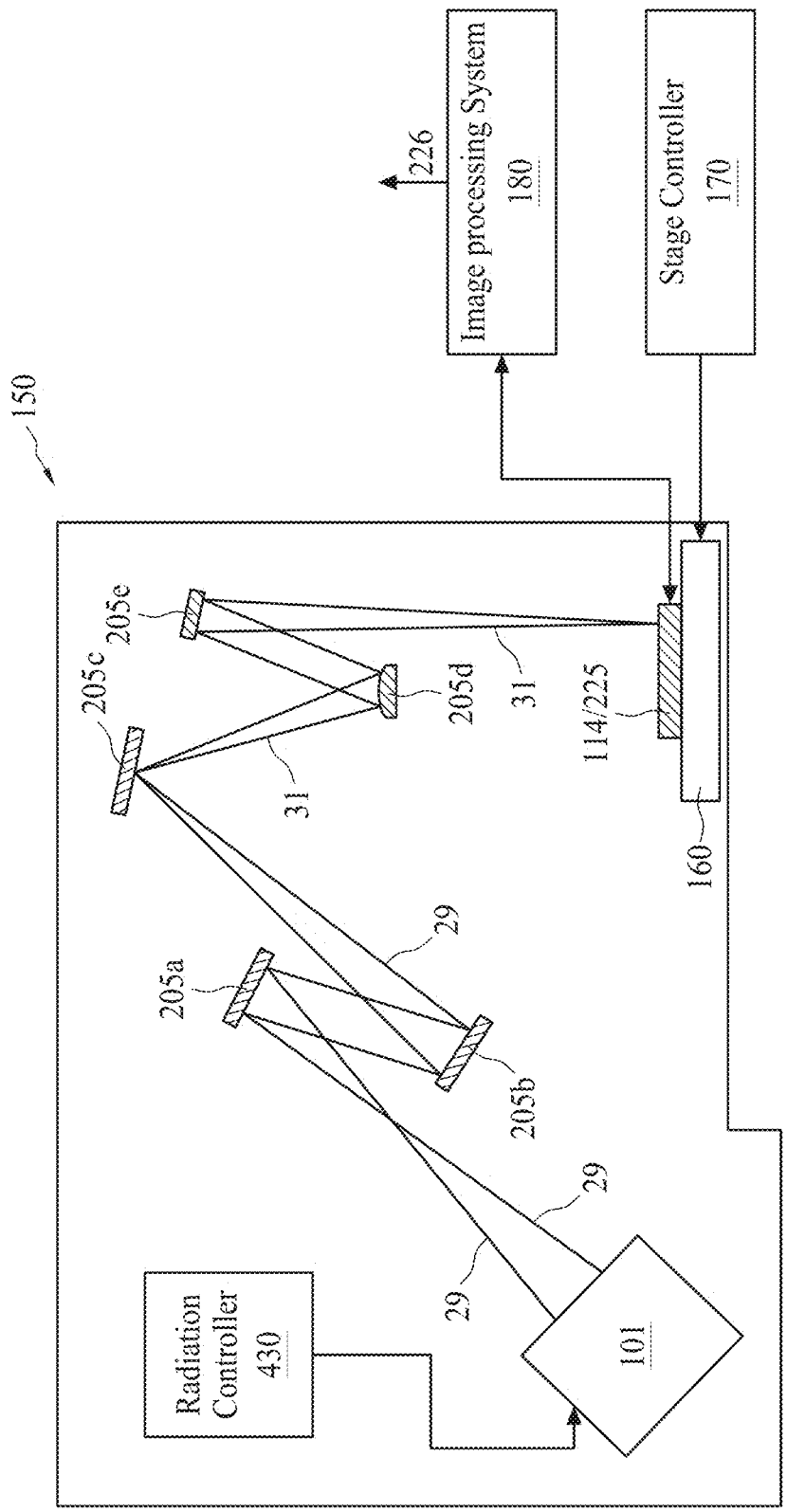
FIGS. 2A and 2B illustrate a schematic diagram of an exposure device of a lithography system.
Figure 2B:
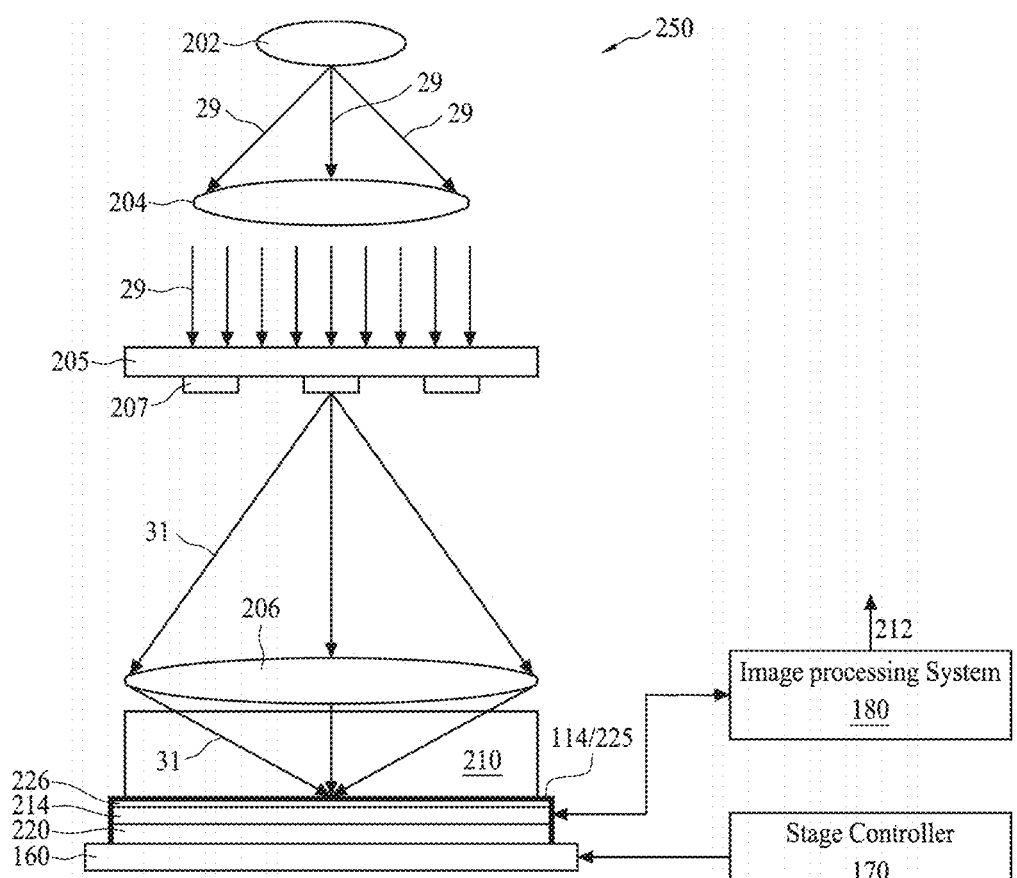

FIGS. 2A and 2B illustrate a schematic diagram of an exposure device of a lithography system. FIG. 2A shows a schematic view of an exposure device 150 for generating a resist pattern on a wafer. The exposure device 150 shows the exposure of the wafer 114 with a patterned beam 31, such as ultraviolet (UV) light or extreme UV (EUV) light. The exposure device 150 may include a wafer movement device, e.g., a stage 160, a stepper, a scanner, a step and scan system, a direct write system, a device using a contact and/or proximity mask, etc., provided with one or more optics 205a, 205b, for example, to illuminate a patterning optic, such as a reticle, e.g., a reflective mask 205c with a radiation beam 29, e.g., a UV radiation beam or an EUV radiation beam. The illumination of the patterning optics may produce a reflected patterned beam 31. One or more reduction projection optics 205d and 205e of the optical system are used for projecting the patterned beam 31 onto the wafer 114. A stage controller 170 may be coupled to the wafer movement device for generating a controlled relative movement between the wafer 114 and the reflective mask 205c. By the controlled relative movement, different dice of the wafer 114 are patterned.

As further shown, the exposure device 150 of FIG. 2A includes a radiation source 101 to generate the radiation beam 29 used to irradiate a resist layer on top of the wafer 114, e.g., a substrate. In some embodiments, because gas molecules absorb EUV light, when the radiation source 101 is an EUV radiation source, the exposure device 150, when operated, is maintained under a vacuum environment to avoid EUV intensity loss. In addition, the exposure device 150 includes a radiation controller 430 to control an intensity of the radiation beam 29. In some embodiments, the radiation controller 430 adjusts the radiation by adjusting a projection time of the lithography operation to pattern the resist layer. In some embodiments, the EUV radiation source 101 has a wavelength between about 10 nm and 100 nm.

In some embodiments, the reflected patterned beam 31 is imaged on an image detector 225 instead of the wafer 114. The image detector 225 is coupled to an image processing system 180 that receives the detected image of the projected layout pattern of the reflective mask 205c. In some embodiments, the image processing system 180 performs one or more processing operations on the detected image to determine, e.g., calculate contours of the detected image and to generate a contour image 212 of the projected layout pattern of the reflective mask 205c. The image processing operations include edge detection, morphological operations, etc.

FIG. 2B shows a schematic view of an exposure device 250 for generating a resist pattern on a wafer and includes a radiation source 202 that generates the radiation beam 29, an illumination optics 204, e.g., a lens, for illuminating a transparent mask 205 with an opaque absorption layer 207 deposited on the transparent mask to define the layout pattern. FIG. 2B also shows reduction projection optics 206, e.g., a lens, for projecting the patterned beam 31 onto the wafer 114 or the image detector 225. The image detector 225 is connected to the image processing system 180 that generates the contour image 212. As shown the exposure device 250 includes the stage 160 that is connected and controlled by the stage controller 170. In some embodiments, the wafer 114 or the image detector 225 is immersed in an immersion material 210, e.g., a liquid, and the patterned beam 31 exiting the transparent mask 205 is in the immersion material 210 when impinging on the wafer 114 or the image detector 225. In some embodiments, the radiation source 202 is a deep UV (DUV) radiation source and has a wavelength between about 100 nm and 300 nm and the immersion material 210 reduces the wavelength of the patterned beam 31. As discussed with respect to FIGS. 2A and 2B the contour image 212 has the contours of the projected layout pattern of the mask on top of the wafer 114. As shown, the wafer 114 of FIGS. 2A and 2B includes a substrate 220, a first layer 214 disposed over the substrate 220, and a resist layer 226 disposed over the first layer 214.

In some embodiments, the projected layout pattern of the mask are imaged on the resist layer 226 and the resist layer 226 is developed to produce a resist pattern in the resist layer 226. In some embodiments, the resist pattern in the resist layer 226 is imaged by a camera or an image detector and the image of the resist pattern is processed by an image processing system, e.g., the image processing system 180, to generate contours of the resist pattern of the resist layer 226.

In some embodiments, the projected layout pattern of the reflective mask 205c of FIG. 2A or the projected layout pattern of the transparent mask 205 of FIG. 2B is determined by simulation. In addition, the transmission/diffusion of the patterned beam 31 in the resist material of the resist layer 226 and the development process of the resist layer 226 to produce the resist pattern are simulated by an image processing system, e.g., the image processing system 180, to generate a simulated resist pattern of the resist layer 226. Additionally, the image processing system determines the contours of the resist pattern based on the simulated resist pattern of the resist layer 226.

Figure 3:
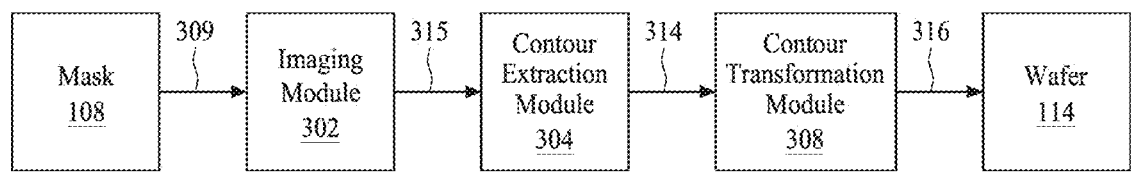
FIG. 3 illustrates a schematic diagram of a resist patterning system in accordance with some embodiments of the disclosure.

FIG. 3 illustrates a schematic diagram of a resist patterning system in accordance with some embodiments of the disclosure. FIG. 3 shows the imaging module 302 that receives the layout pattern of the mask 108 and generates the projected pattern 315 of the layout pattern 309 of the mask 108 on the wafer 114. In some embodiments, the imaging module determines, e.g., simulates, the projection of the layout pattern 309 of the mask 108 on top of the wafer 114. Thus, the projected pattern 315 does not include the interaction of the resist layer with the patterned beam 31 and also does not include the development process of the resist layer. The mask 108 is consistent with the reflective mask 205c of FIG. 2A or the transparent mask 205 of FIG. 2B.

FIG. 3 further includes a contour extraction module 304 that receives the projected pattern 315 and determines contours 314 of the projected pattern 315. In some embodiments, the layout pattern 309 is the contours of the layout pattern of the mask 108.

FIG. 3 also includes a contour transformation module 308 that receives the contours 312 of the projected layout pattern and determines, e.g., simulates or calculates, the contours 316 of a resist pattern over the wafer 114. Thus, the contour transformation module 308 simulates, e.g., calculates, the interaction of the resist layer over the wafer 114 with the patterned beam 31 and also simulates the development process of the resist layer. In some embodiments, the combination of the imaging module 302, the contour extraction module 304, and the contour transformation module 308 are consistent with the wafer simulation module 130 of FIG. 1B.

FIGS. 4A, 4B, 4C, and 4D illustrate contours of geometric shapes projected on top of a resist layer disposed over a wafer and the corresponding contour of the geometric shapes developed in the resist layer. FIGS. 4A, 4B, 4C, and 4D show the respective contours 314 of the projected geometric shapes 435, 440, and 450 of a projected pattern on top of the wafer 114 and corresponding contours 312 of the resist pattern developed over the wafer 114. In some embodiments, the contours 314 are measured using the image processing system 180 of FIG. 2A or 2B. The contours 312 are either measured by producing the resist patterns, imaging the resist patterns, and generating the contours 312 by the image processing system 180 or simulating the transmission and diffusion of the patterned beam 31 in the resist material of the resist layer of wafer and also simulating the development process of the resist layer. In some embodiments, the contours 314 are simulated using the system of FIG. 5.

Figure 4A:
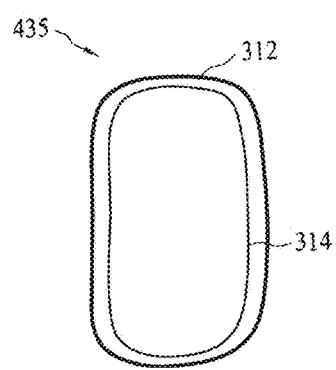
FIGS. 4A, 4B, 4C, and 4D illustrate contours of geometric shapes projected on top of a resist layer disposed over a wafer and the corresponding contour of the geometric shapes developed in the resist layer.
Figure 4B:
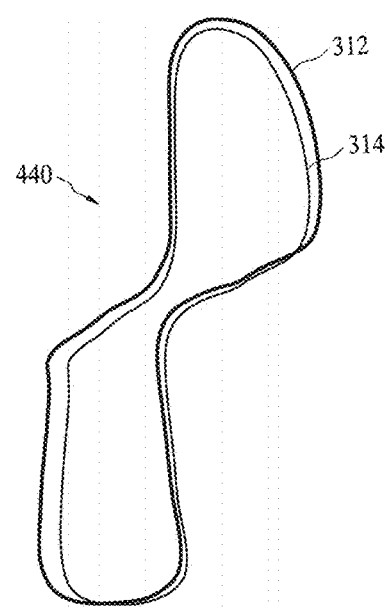
Figure 4C:
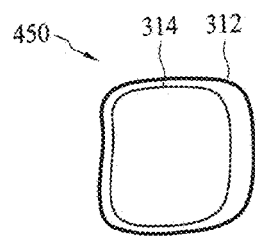
Figure 4D:
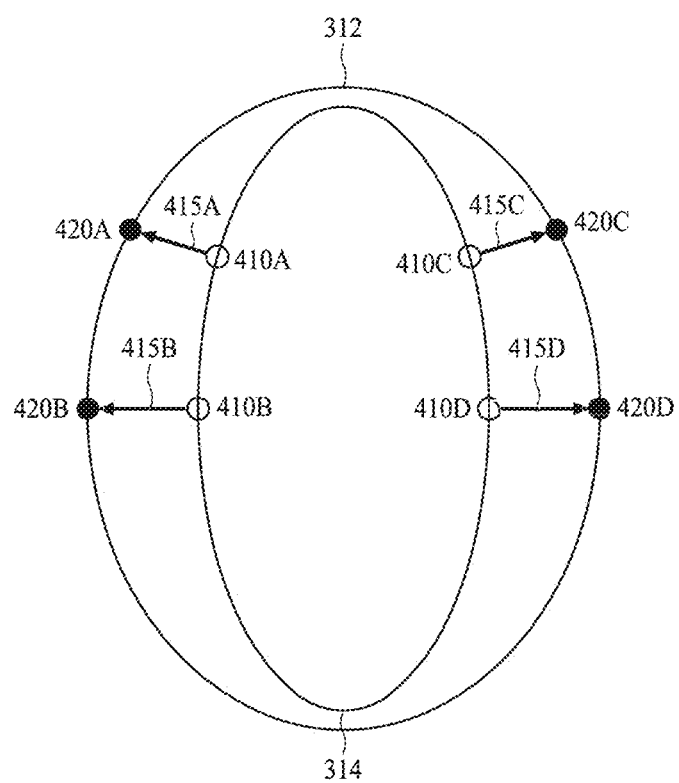

FIG. 4D additionally shows a transformation of the contour 314 to the contour 312. The transformation is defined by a plurality of vectors, e.g., contour biases, that shifts one point on the contour 314 to a corresponding point on the contour 312. As an example, FIG. 4D shows the transformation of points 410A, 410B, 410C, and 410D on the contour 314 by corresponding contour biases 415A, 415B, 415C, and 415D to points 420A, 420B, 420C, and 420D on the contour 312. Thus, the transformation of the contour 314 to the contour 312 is defined by a plurality of vectors. In some embodiments, the plurality of vectors include about 10 to 1000 vectors that act on the contours 314 of the projected geometric shapes of the projected pattern on top of the wafer 114 and produce the contours 312 of the resist pattern developed over the wafer 114. In some embodiments, the plurality of vectors are uniformly distributed. As shown the contour biases are vectors that include a direction and an angle.

Figure 5:
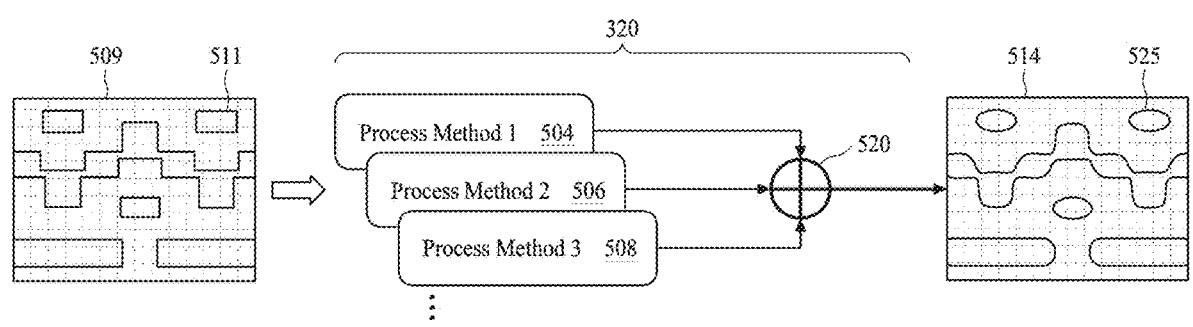
FIG. 5 illustrates a contour transform unit for transforming the contours of a layout pattern of a photo mask into corresponding contours projected over a resist layer on a wafer in accordance with some embodiments of the disclosure.

FIG. 5 illustrates the contour generator 320 for transforming the contours of a layout pattern 509 of a photo mask into corresponding contours projected over a resist layer on a wafer in accordance with some embodiments of the disclosure. As shown the contour generator 320 includes a plurality of process methods 504, 506, 508, etc. The plurality of the process methods receive the layout pattern 509 or the contours of the layout pattern 509 that are consistent with the contours of a layout pattern 309, perform image processing operations on the layout pattern 509 and/or the contours of the layout pattern 509, and combine (by a combine operator 520) the outcome of the image processing operations to generate the contours of the projected pattern 514 on top of the wafer 114. The layout pattern 509 includes the geometric shapes 511 and the projected pattern 514 includes the geometric shapes 525. In some embodiments, the layout pattern 509 is consistent with the layout pattern 309 of FIG. 3 and the contours of the projected pattern 514 of the mask 108 on top of the wafer 114 is consistent with the contours 314 of the projected pattern of the mask 108 on top of the wafer 114. In some embodiments, the process methods 504, 506, and 508 include one of a projection of the layout pattern of the mask 108 on top of the wafer 114, an edge detection (e.g., a gradient operation) of the projected layout pattern, a morphological operation, e.g., dilation or erosion, of the projected layout pattern, or an averaging operation. In some embodiments, the weighted sum of two or more of the process methods is calculated.

In some embodiments, the contour generator 320 is consistent with the combination of the contour extraction module 304 and the imaging module 302. The contour generator 320 receives the contours of the layout pattern 309 of the mask 108 and generates the contours 314 of the projected layout pattern of the mask 108 on top of the wafer 114. In some embodiments, the process methods include edge detection, morphological operations, projection operation, etc.

Figure 6A:
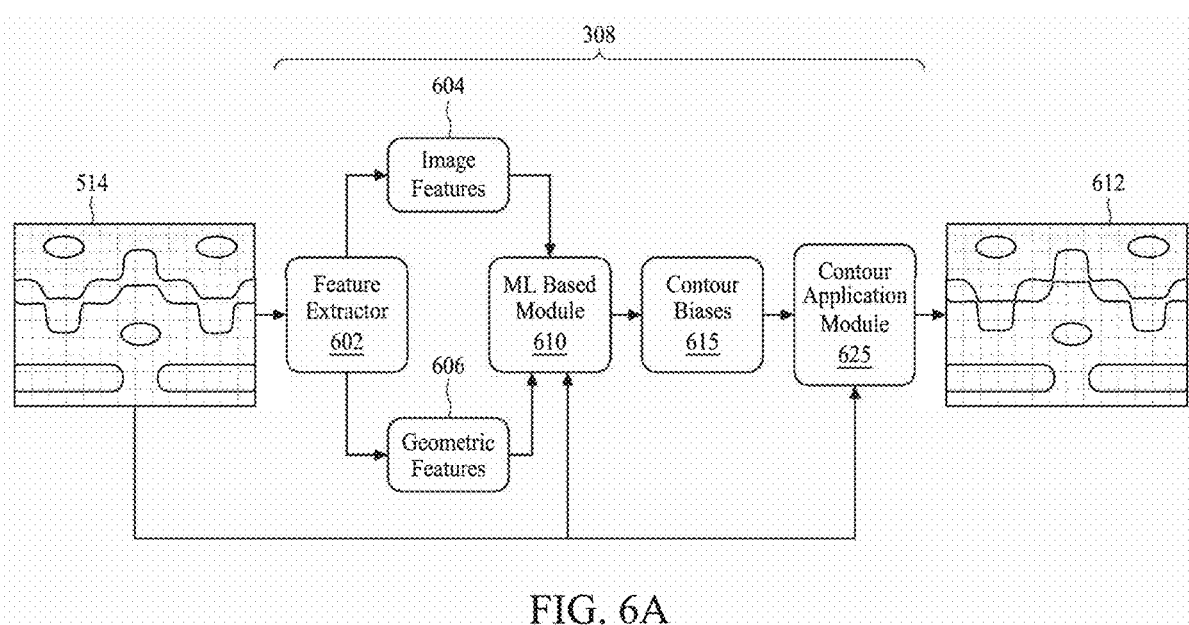
FIGS. 6A and 6B illustrate a transformation system between contours of geometric shapes projected over a resist layer to contours of the corresponding geometric shape developed in the resist layer and a geometric feature of the contours used for defining the transformation in accordance with some embodiments of the disclosure.
Figure 6B:
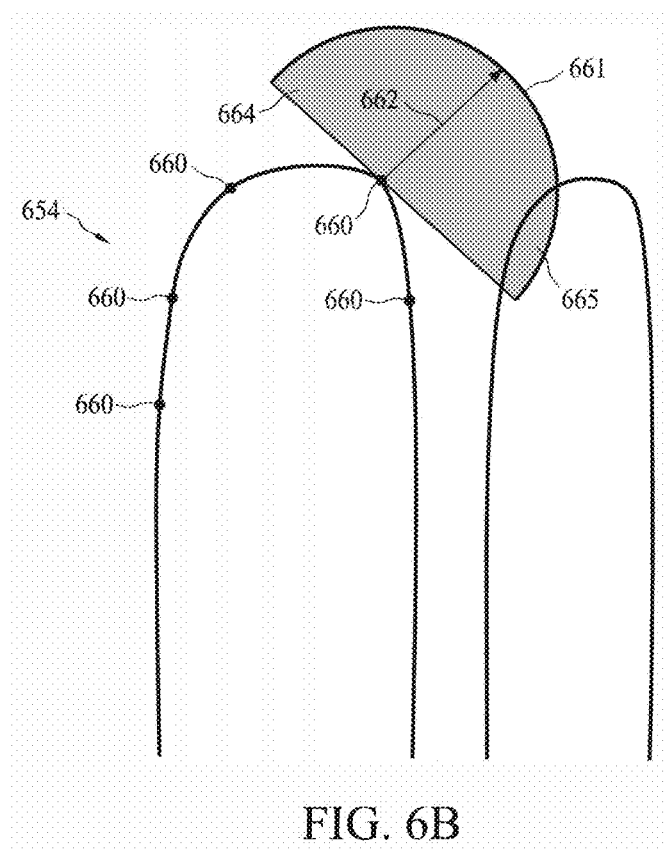

FIGS. 6A and 6B illustrate a transformation system between contours of geometric shapes projected over a resist layer to contours of the corresponding geometric shape developed in the resist layer and a geometric feature of the contours used for defining the transformation in accordance with some embodiments of the disclosure. FIG. 6A shows the contour transformation module 308 that receives the contours of the projected pattern 514 on top of the wafer 114 and produces the contours of the resist pattern 612 developed over the wafer 114. The contour transformation module 308 includes a feature extractor 602 that receives the contours of the projected pattern 514 on top of the wafer 114 and generates one or more image features 604 and one or more geometric features 606. In some embodiments, an image feature is a parameter that affects the entire projected pattern or the resist pattern, e.g., an energy of the radiation beam for lithography, a type of the resist material such as positive-tone or negative-tone, a reaction speed of the developer material, etc. In some embodiments, a geometric feature is a parameter that shows how the contours are packed, the minimum and maximum curvature of the contours, the minimum and the maximum dimension of the contours, etc.

As shown in FIG. 6A, the contour transformation module 308 includes a machine learning (ML) based module 610, e.g., a neural network or a deep neural network. The ML based module uses the image features 604 and the geometric features 606 and the contours of the projected pattern 514 and generates a set of contour biases 615 consistent with the contour biases 415A, 415B, 415C, and 415D. The contour biases 615 are applied, by a contour application module 625, to the contours of the projected pattern 514 and the contours of the resist pattern 612 developed over the wafer 114 are generated. In some embodiments, a weigh function is multiplied to the contour biases 615 before the contour application module 625 applies the biases. In some embodiments, the weight function is a constant between zero and one. In some embodiments, the weight function is between zero and one but the weight function value depends on the location of the contour. As described, the contour transformation module 308 works on a contour image as input and generates another contour image as output.

FIG. 6B shows how a geometric feature that how the contours are packed is calculated. As shown, a semicircle 661, having a radius 662, is centered at one or more points 660 on the perimeter of a contour 654. In some embodiments, a symmetry line of the semicircle is perpendicular to a tangent line to the contour 654 at the selected point 660. The semicircle is rotated between +60 degrees and −60 degrees and an overlap ratio of an area 665 inside one or more neighboring contours and an area 664 outside the contours is calculated. In some embodiments, an average of the overlap ratio for each point 660 is calculated as a geometric feature of the contour 654.

Figure 7:
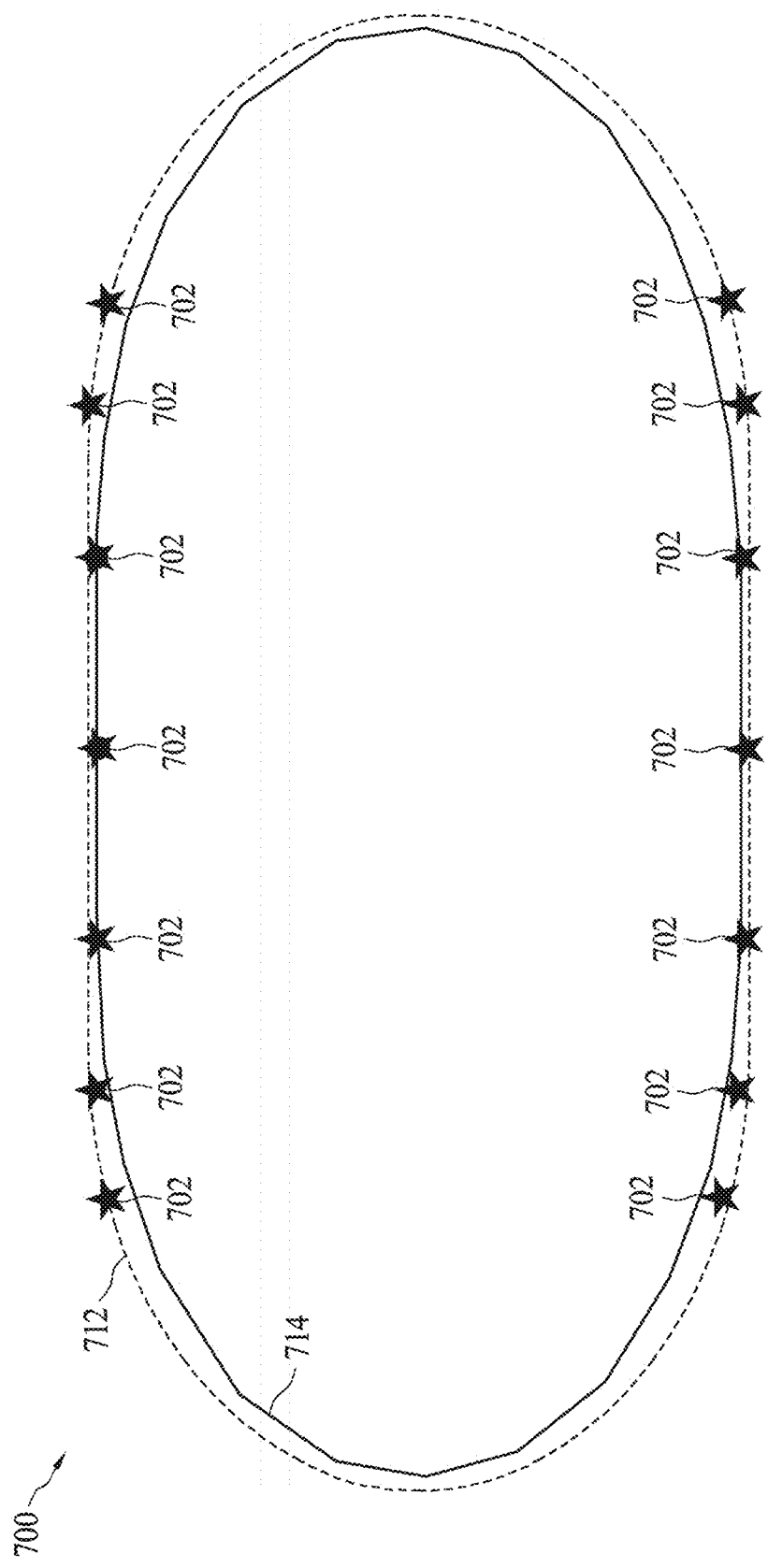
FIG. 7 illustrates a transformation of a contour of a geometric shape projected on a resist layer to a contour of the corresponding geometric shape determined in the developed resist layer and measurement results of the contour of the corresponding geometric shape in the developed resist layer in accordance with some embodiments of the disclosure.

FIG. 7 illustrates a transformation 700 of a contour of a geometric shape projected on a resist layer to a contour of the corresponding geometric shape determined in the developed resist layer and measurement results of the contour of the corresponding geometric shape in the developed resist layer in accordance with some embodiments of the disclosure. FIG. 7 shows the contour 714, consistent with the contour 314, that is the projected layout pattern of the mask 108 on top of the wafer 114. FIG. 7 also shows the contour 712, consistent with the contour 312, of the resist pattern developed over the wafer 114 that is calculated using the combination of the systems in FIGS. 5 and 6A. In addition, FIG. 7 shows the points 702 of the measured points on the contour of the resist pattern. As shown, the measured points 702 essentially coincide with the contour 712 but have some distance with the contour 714 at a number of points. In some embodiments, the distances between the measured points 702 and the contour 714 of the projected layout pattern of the mask 108 on top of the wafer 114 has a root mean square value of 0.73 nm. In some embodiments, the distances between the measured points 702 and the contour 712 of the resist pattern developed over the wafer 114 has a root mean square value of 0.38 nm. Thus, using the methods introduced above, the difference between the measured points and the calculated contour is reduced.

In some embodiments, the wafer 114 is etched using the patterned resist layer. In some embodiments, the patterned resist layer is used to pattern a hard mask for etching. The etching, e.g., a wet etching, a dry etching, or a combination thereof, may generate another set of contour biases that can be incorporated and added to the contour biases 615.

Figure 8:
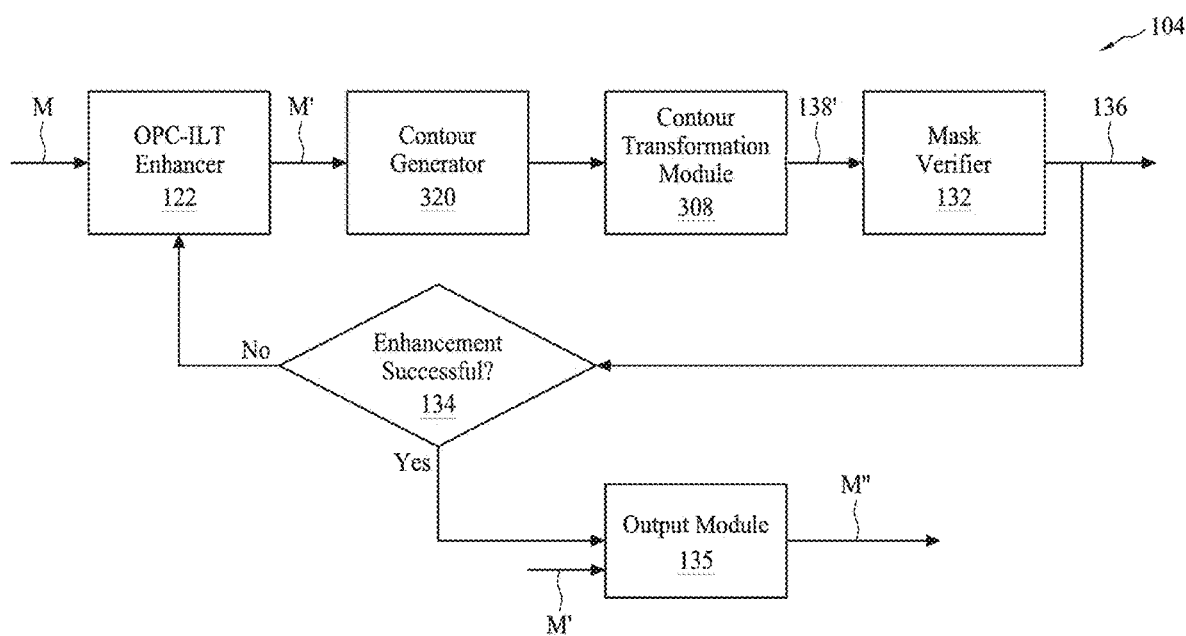
FIG. 8 illustrates a process for enhancing a lithographic mask in accordance with some embodiments of the disclosure.

FIG. 8 illustrates a process for enhancing a lithographic mask in accordance with some embodiments of the disclosure. FIG. 8 shows the mask enhancement system 104 that includes the OPC-ILT enhancer 122 that receives the layout pattern M, generated by the mask design module 102 of FIG. 1, and produces an OPC-ILT-enhanced layout pattern M'. The mask enhancement system 104 of FIG. 8 also includes a contour generator 320 and a contour transformation module 308. In some embodiments, the contour generator 320 (described with respect to FIG. 5) generates the contours of the projected pattern on top of the wafer 114. Thus, the contour generator 320 generates the contours of the corrected and enhanced layout pattern M' when projected on top of the wafer 114. The contour transformation module 308 (described with respect to FIG. 6A) includes the ML based module 610 that is trained to receive the contours of the corrected and enhanced layout pattern M' after being projected on top of the wafer 114 and to determine, e.g., generate, the contours of a resist layer that is developed on the wafer 114. Thus, the output of the contour transformation module 308 is the contours 138' of the resist pattern.

As described above, the mask verifier 132 of the mask enhancement system 104 inspects the contours 138' of the resist pattern to find the defects of the resist pattern and generates the defect list 136 of the defects of the contours 138' of the resist pattern. In some embodiments, the defect list 136 is tested at step 134 and if the defect list 136 is not empty, the iterations continue by modifying the OPC and ILT enhancement at the OPC-ILT enhancer 122. In some embodiments, if the defect list 136 is empty, the output module 135 provides the corrected and enhanced layout pattern of the current iteration as enhanced layout pattern M" at the output of the mask enhancement system 104. In some embodiments, a defect is identified when a critical dimension (CD) uniformity or a uniformity of the space between the geometric shapes of the contours 138' is below a desired threshold.

In some embodiments, the contours 138' of the resist pattern provided by the contour transformation module 308 is verified by the mask verifier 132 as having the radiation energy level and/or focus parameters within a process window. In some embodiments, the focus parameters are determined based on the radiation energy level and the projection parameters. In some embodiments, the process window includes an energy threshold level or a range for the radiation unit 113 of the wafer projection system 112 of FIG. 1A to generate the contours 138' of the resist pattern on the wafer 114. In some embodiments, the process window includes the depth of focus threshold level or the depth of focus range for the contours 138' of the resist pattern on the wafer 114 such that due to roughness and/or flatness of the surface of the wafer 114, the contours 138' of the resist pattern with the depth of focus within the focus threshold range is produced on the wafer 114. Thus, in addition to the defects, the defect list 136 may present the other deficiencies as a defect. The other deficiencies include out of the energy threshold range and/or out of the focus threshold range. In some embodiments, no resist pattern is selected at step 134 and the iterations continue with additional corrections and enhancements by the OPC-ILT enhancer 122.

Figure 9:
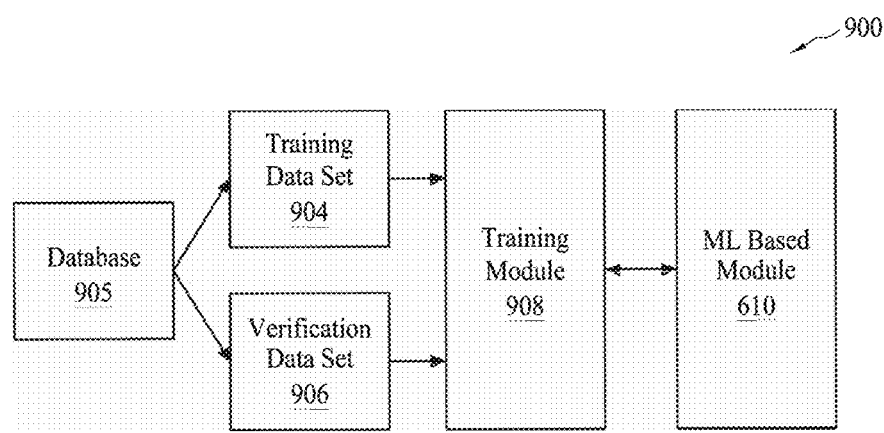
FIG. 9 illustrates an exemplary training system for training a machine learning (ML) based model in accordance with some embodiments of the disclosure.

FIG. 9 illustrates an exemplary training system for training an ML based model in accordance with some embodiments of the disclosure. FIG. 9 includes the database 905 where each record of the database 905 includes the contours of the OPC-ILT-enhanced layout pattern M' when projected on top of the wafer 114 and the corresponding contours 138' of the resist pattern. In addition to the OPC-ILT-enhanced layout pattern M' and the corresponding contours 138' of the resist pattern, each record of the database 905 may include the projection parameters 140 that are used for generating the contours 138' of the resist pattern from the projected OPC-ILT-enhanced layout pattern M'. In some embodiments, the records of the database 905 are divided into a training data set 904 and a verification data set 906. In some embodiments, a training module 908 of the training system 900 uses the training data set 904 to train the ML based module 610. As noted, the contours of the OPC-ILT-enhanced layout pattern M' when projected on top of the wafer 114 in each record of the database 905 is an input of the ML based module 610 and a corresponding contours 138' of the resist pattern in the same record of the database 905 is the output of the ML based module 610. In some embodiments, the training of the ML based module 610 includes setting the parameters of the ML based module 610 such that each projected OPC-ILT-enhanced layout pattern M' of a record of the database 905 produces the corresponding contours 138' of the resist pattern of the same record of the database 905. In some embodiments, the parameters of ML based module 610 are the parameters of a neural network, e.g., a deep neural network. In some embodiments, the parameters of the ML based module 610 are determined in an iterative procedure. Initially, the parameters are set to initial values, e.g., random values, the outputs of the ML based module 610 to each contour of the OPC-ILT-enhanced layout pattern M' when projected on the wafer 114 as the inputs are determined, and an error, e.g., sum of the squared differences between the corresponding contours 138' of the resist pattern of the database 905 and the outputs of the ML based module 610 are determined. Then, the parameters of the ML based module 610 are iteratively modified until the error is minimized, e.g., the error becomes less than a threshold.

In some embodiments, after the training module 908 trains the ML based module 610 with the training data set 904, the training module 908 verifies the training with a verification data set 906. In some embodiments, the verification data set 906 is separate from the training data set 904 and the training is verified when for each record of the training data set 904 an error, e.g., a squared error, between the contours 138' of the resist pattern of a record of the database 905 and the output of the ML based module 610 to the corresponding contours of the OPC-ILT-enhanced layout pattern M' when projected on top of the wafer 114 of the same record is below a threshold level. In some embodiments, if the training is not verified, the training data set 904 is increased and the ML based module 610 is retrained.

Figure 10:
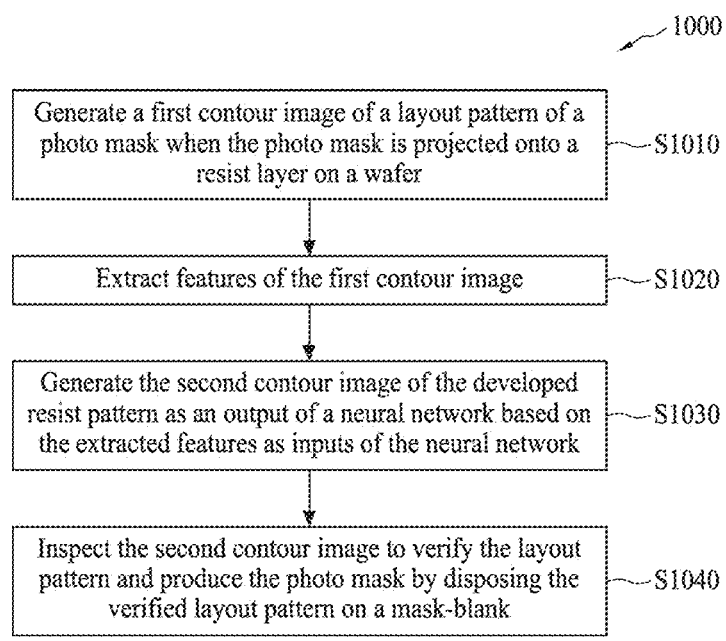
FIG. 10 illustrates a flow diagram of a process for transformation of contours of geometric shapes projected over a resist layer to contours of the corresponding geometric shapes in the developed resist layer in accordance with some embodiments of the disclosure.

FIG. 10 illustrates a flow diagram 1000 of a process for transformation of contours of layout patterns projected over a resist layer to contours of the corresponding developed resist pattern in accordance with some embodiments of the disclosure. The method includes an operation S1010 where a first contour image associated with a projected layout pattern of a photo mask is generated when the photo mask is projected onto a resist layer on a wafer. The contour image is generated by FIG. 5. In operation S1020, features of the first contour image are extracted. As shown in FIG. 6A, the features are extracted by the feature extractor 602. In operation S1030, the second contour image of the developed resist pattern is generated as an output of a neural network based on the extracted features as inputs of the neural network. As shown in FIG. 6A, the contours of the resist pattern 612 are generated based on the contours of the projected pattern 514. In operation S1040, the second contour image is inspected to verify the layout pattern and the verified layout pattern is disposed on a mask-blank to produce the photo mask. In some embodiments, the photo mask is produced by the mask projection system 106 of FIG. 1.

Figure 11A:
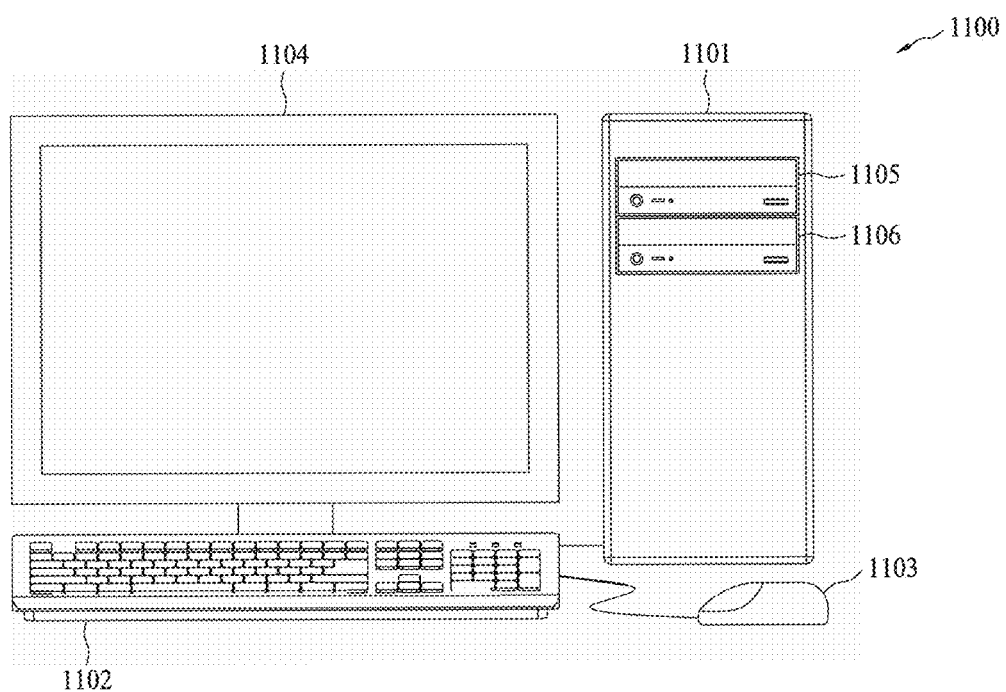
FIGS. 11A and 11B illustrate an apparatus for manufacturing a lithographic mask for a semiconductor circuit in accordance with some embodiments of the disclosure.
Figure 11B:
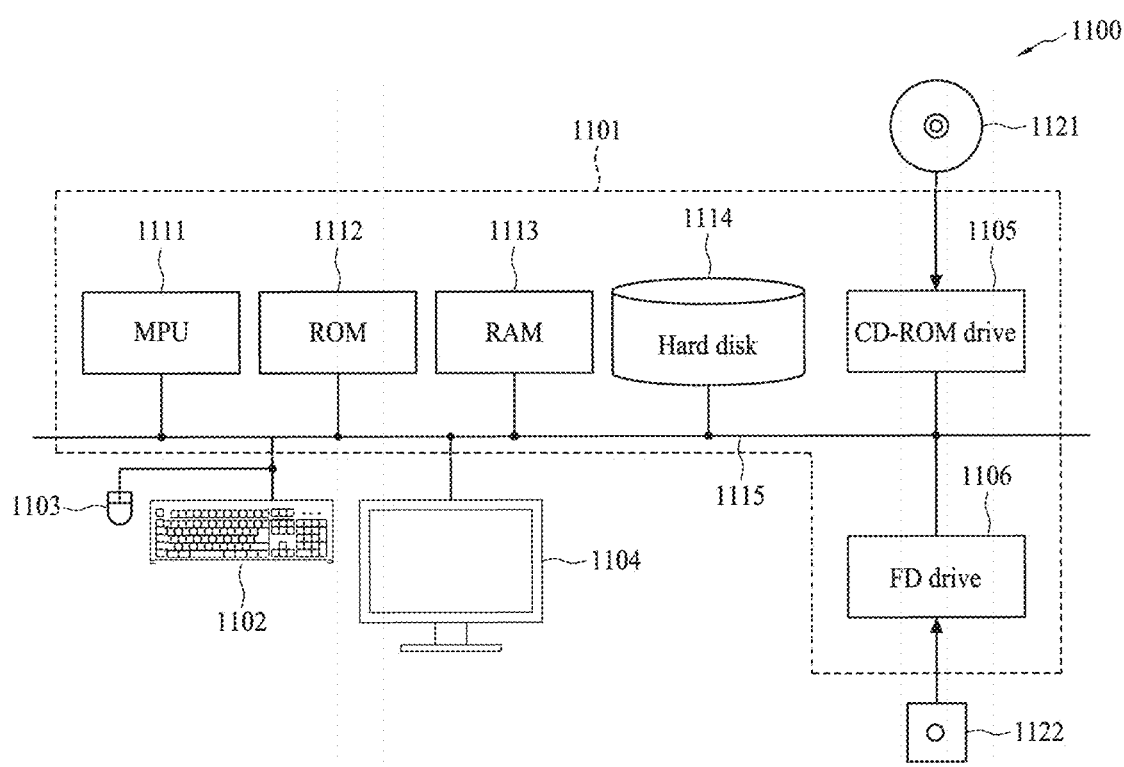

FIGS. 11A and 11B illustrate an apparatus for manufacturing a lithographic mask for a semiconductor circuit in accordance with some embodiments of the disclosure. FIG. 11A is a schematic view of a computer system that executes the process for manufacturing the lithographic mask according to one or more embodiments as described above. All of or a part of the processes, method and/or operations of the foregoing embodiments can be realized using computer hardware and computer programs executed thereon. The operations include OPC correction, ILT enhancement, mask projection, defect detection, and the ML based module training and operation in some embodiments. In FIG. 11A, a computer system 1100 is provided with a computer 1101 including an optical disk read only memory (e.g., CD-ROM or DVD-ROM) drive 1105 and a magnetic disk drive 1106, a keyboard 1102, a mouse 1103, and a monitor 1104.

FIG. 11B is a diagram showing an internal configuration of the computer system 1100. The computer 1101 is provided with, in addition to the optical disk drive 1105 and the magnetic disk drive 1106, one or more processors 1111, such as a micro processing unit (MPU), a ROM 1112 in which a program, such as a boot up program is stored, a random access memory (RAM) 1113 that is connected to the MPU 1111 and in which a command of an application program is temporarily stored and a temporary storage area is provided, a hard disk 1114 in which an application program, a system program, and data are stored, and a bus 1115 that connects the MPU 1111, the ROM 1112, and the like. Note that the computer 1101 may include a network card (not shown) for providing a connection to a LAN.

The program for causing the computer system 1100 to execute the process for manufacturing the lithographic mask of a semiconductor device in the foregoing embodiments may be stored in an optical disk 1121 or a magnetic disk 1122, which are inserted into the optical disk drive 1105 or the magnetic disk drive 1106, and transmitted to the hard disk 1114. Alternatively, the program may be transmitted via a network (not shown) to the computer 1101 and stored in the hard disk 1114. At the time of execution, the program is loaded into the RAM 1113. The program may be loaded from the optical disk 1121 or the magnetic disk 1122, or directly from a network. The program does not necessarily have to include, for example, an operating system (OS) or a third party program to cause the computer 1101 to execute the process for manufacturing the lithographic mask of a semiconductor device in the foregoing embodiments. The program may only include a command portion to call an appropriate function (module) in a controlled mode and obtain desired results.

According to some embodiments of the present disclosure, a method of manufacturing a lithographic mask of an integrated circuit for semiconductor device manufacturing includes generating a first contour image associated with a layout pattern of the lithographic mask when the layout pattern of the lithographic mask is projected on a wafer and extracting features of the first contour image. The method further includes generating a second contour image of a developed photo resist pattern on the wafer associated with the layout pattern of the lithographic mask as an output of a neural network based on the features of the first contour image as inputs of the neural network. The method also includes inspecting the second contour image to verify that the layout pattern of the lithographic mask does not produce defects and producing the lithographic mask by disposing the verified layout pattern on a mask-blank. In an embodiment, the method further includes projecting the verified layout pattern of the lithographic mask onto a photo resist layer of the wafer to generate a resist pattern. In an embodiment, the second contour image of the developed photo resist pattern is generated with a deep neural network. In an embodiment, the features of the first contour image include image features and geometric features. In an embodiment, the second contour image corresponds to one or more parameters of the layout pattern and the verification of the layout pattern of the lithographic mask further includes verifying the one or more parameters are within a process window. The process window includes a threshold range of radiation energy for generating the developed photo resist pattern and a depth of focus threshold range for the developed photo resist pattern. In an embodiment, the verification that the layout pattern of the lithographic mask does not generate defects includes verifying a probability of generating a defect in the developed photo resist pattern on the wafer is below a first threshold level. In an embodiment, the generating the second contour image further includes generating contour biases by the neural network based on the features of the first contour image and applying the contour biases to the first contour image to generate the second contour image.

According to some embodiments of the present disclosure, a method of manufacturing a lithographic mask of an integrated circuit for semiconductor device manufacturing includes performing an optical proximity correction (OPC) process to a layout pattern of the integrated circuit to produce a corrected layout pattern. The method further includes performing an inverse lithographic technology (ILT) process to the corrected layout pattern to enhance the corrected layout pattern to produce an OPC-ILT-enhanced layout pattern of the lithographic mask. The method also includes generating a first contour image associated with the OPC-ILT-enhanced layout pattern when the OPC-ILT-enhanced layout pattern of the lithographic mask is projected on a wafer. The method also includes extracting features of the generated first contour image. The method includes generating a second contour image of a developed photo resist pattern on the wafer associated with the OPC-ILT-enhanced layout pattern as an output of a deep neural network based on the features of the first contour image as inputs. In an embodiment, the method further includes inspecting the developed photo resist pattern on the wafer to verify that the OPC-ILT-enhanced layout pattern of the lithographic mask does not generate defects, and projecting the verified OPC-ILT-enhanced layout pattern of the lithographic mask on a photo resist layer of the wafer. In an embodiment, the generating the second contour image further includes generating contour biases by the deep neural network based on the features of the first contour image, and applying the contour biases to the first contour image to generate the second contour image. In an embodiment, prior to the generating the second contour image, generating a database that includes generating a plurality of integrated circuit layout patterns, performing zero, one, or both of OPC operation or ILT enhancement on each one of the plurality of integrated circuit layout patterns to produce enhanced layout patterns, generating a plurality of first contour images corresponding with projecting the enhanced layout patterns of the lithographic mask on the wafer, generating a plurality of second contour images of developed photo resist patterns on the wafer corresponding with the plurality of first contour images such that each second contour image is an output of the deep neural network based on the features of the corresponding first contour image as inputs, storing the plurality of second contour images and the corresponding first contour images in the database, training the neural network based on a first portion of the database, the features of the first contour images are inputs of the neural network and the corresponding second contour images are outputs of the neural network, and training the neural network based on a first portion of the database, the features of the first contour images are inputs of the neural network and the corresponding second contour images are outputs of the neural network. In an embodiment, the integrated circuit for semiconductor device is stored in a graphic design system (GDS) file, and the OPC-ILT-enhanced layout pattern is stored in an adjusted GDS file. In an embodiments, the method further includes performing two or more mask projections for each one of the OPC-ILT-enhanced layout patterns to generate two or more corresponding first contour images for each one of the OPC-ILT-enhanced layout patterns, the two or more mask projections are within a process window with different exposure doses and different depth of focus conditions. In an embodiment, the layout pattern of the integrated circuit includes a corresponding exposure dose and a corresponding depth of focus for generating the first contour image, the method further includes verifying the corresponding exposure dose and the corresponding depth of focus are within the process window.

According to some embodiments of the present disclosure, a system for producing a lithographic mask for semiconductor manufacturing includes an OPC-ILT enhancer module to receive a first layout pattern corresponding to an integrated circuit, perform an optical proximity correction (OPC) process to the first layout pattern to produce a first corrected layout pattern, to perform an inverse lithographic technology (ILT) process to the first corrected layout pattern to enhance the first corrected layout pattern to produce a first OPC-ILT-enhanced layout pattern, and to generating a first contour image associated with the first OPC-ILT-enhanced layout pattern when the first OPC-ILT-enhanced layout pattern of the lithographic mask is projected on a wafer, and extracting features of the generated first contour image. The system further includes a deep neural network to receive the features of the first contour image as inputs, and to generate a second contour image of a developed photo resist pattern on the wafer corresponding with the OPC-ILT-enhanced layout pattern as an output. The system also includes a mask verifier module to inspect the second contour image on the wafer to verify that the second contour image does not have defects. In an embodiment, the first OPC-ILT-enhanced layout pattern includes one or more parameters associated with the first OPC-ILT-enhanced layout pattern, and the mask verifier module further verifies the one or more parameters are within a process window, the process window includes a threshold range of radiation energy for generating the second contour image and a depth of focus threshold range for generating the second contour image. In an embodiment, the system further includes a storage memory and a training module. The training module receives a plurality of first contour images corresponding with projecting the OPC-ILT-enhanced layout patterns on the wafer, receives a plurality of second contour images, corresponding to the plurality of first contour images, of the developed photo resist patterns on the wafer, stores the plurality of first contour images and the corresponding second contour images in a database in the storage memory, performs a training of the neural network based on a first portion of the database such that the features of the first contour images are inputs of the neural network and the corresponding second contour images are outputs of the neural network, and performs a verification of the neural network based on a remaining second portion of the database. In an embodiment, the system further includes a mask design module coupled to the OPC-ILT enhancer module that generates the first OPC-ILT-enhanced layout pattern for the OPC-ILT enhancer module. In an embodiment, the system further includes a mask projection system that uses a radiation source to project the first OPC-ILT-enhanced layout pattern on a mask-blank to produce the lithographic mask. In an embodiment, the first layout pattern corresponding to the integrated circuit is stored as a graphic design system (GDS) file, and the OPC-ILT-enhanced layout patterns are adjusted GDS files.

As described, the layout patterns of a photo mask is corrected by the OPC operation and is enhanced by the ILT operation to eliminate the probability of defects being produced in the resist pattern. In the above methods, the OPC correction design and the ILT enhancement design are performed not only based on the projected patterns on the wafer but also based on the developed resist patterns.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a lithographic mask of an integrated circuit for semiconductor device manufacturing, comprising:
   performing an optical proximity correction (OPC) process to a layout pattern of the integrated circuit to produce a corrected layout pattern;
   performing an inverse lithographic technology (ILT) process to the corrected layout pattern to enhance the corrected layout pattern to produce an OPC-ILT-enhanced layout pattern of the lithographic mask;
   generating a first contour image associated with the OPC-ILT-enhanced layout pattern of the lithographic mask when the OPC-ILT-enhanced layout pattern of the lithographic mask is projected on a wafer;
   extracting features of the first contour image;
   generating a second contour image of a developed photo resist pattern on the wafer associated with the OPC-ILT-enhanced layout pattern of the lithographic mask as an output of a neural network based on the features of the first contour image as inputs of the neural network, wherein the generating the second contour image comprises generating contour biases by the neural network based on the features of the first contour image, and applying the contour biases to the first contour image to generate the second contour image;
   inspecting the second contour image to verify that the OPC-ILT-enhanced layout pattern of the lithographic mask does not produce defects, wherein the second contour image corresponds to one or more parameters of the OPC-ILT-enhanced layout pattern, and wherein the verification of the OPC-ILT-enhanced layout pattern of the lithographic mask includes verifying the one or more parameters are within a process window, wherein the process window comprises a threshold range of radiation energy for generating the developed photo resist pattern and a depth of focus threshold range for the developed photo resist pattern;
   producing the lithographic mask by disposing the verified OPC-ILT-enhanced layout pattern on a mask-blank; and
   projecting the verified OPC-ILT-enhanced layout pattern of the lithographic mask onto a photo resist layer of the wafer to generate a resist pattern.

2. The method of claim 1, wherein the second contour image of the developed photo resist pattern is generated with a deep neural network.

3. The method of claim 1, wherein the features of the first contour image comprise image features and geometric features.

4. The method of claim 1, wherein the verification that the OPC-ILT-enhanced layout pattern of the lithographic mask does not generate defects comprises:
   verifying a probability of generating a defect in the developed photo resist pattern on the wafer is below a first threshold level.

5. The method of claim 1, wherein the first contour image and the second contour image are stored in a database in a storage memory.

6. The method of claim 1, wherein the neural network includes a deep neural network.

7. The method of claim 1, wherein the integrated circuit for semiconductor device is stored in a graphic design system (GDS) file.

8. A method of manufacturing a lithographic mask of an integrated circuit for semiconductor device manufacturing, comprising:
   performing an optical proximity correction (OPC) process to a layout pattern of the integrated circuit to produce a corrected layout pattern;
   performing an inverse lithographic technology (ILT) process to the corrected layout pattern to enhance the corrected layout pattern to produce an OPC-ILT-enhanced layout pattern of the lithographic mask;
   generating a first contour image associated with the OPC-ILT-enhanced layout pattern when the OPC-ILT-enhanced layout pattern of the lithographic mask is projected on a wafer;
   extracting features of the generated first contour image; and
   generating a second contour image of a developed photo resist pattern on the wafer associated with the OPC-ILT-enhanced layout pattern as an output of a deep neural network based on the features of the first contour image as inputs, wherein the generating the second contour image comprises generating contour biases by the deep neural network based on the features of the first contour image, and applying the contour biases to the first contour image to generate the second contour image.

9. The method of claim 8, further comprising:
inspecting the developed photo resist pattern on the wafer to verify that the OPC-ILT-enhanced layout pattern of the lithographic mask does not generate defects; and
projecting the verified OPC-ILT-enhanced layout pattern of the lithographic mask on a photo resist layer of the wafer.

10. The method of claim 8, wherein prior to the generating the second contour image,
generating a database that comprises:
generating a plurality of integrated circuit layout patterns;
performing zero, one, or both of OPC operation or ILT enhancement on each one of the plurality of integrated circuit layout patterns to produce enhanced layout patterns;
generating a plurality of first contour images corresponding with projecting the enhanced layout patterns of the lithographic mask on the wafer;
generating a plurality of second contour images of developed photo resist patterns on the wafer corresponding with the plurality of first contour images, wherein each second contour image is an output of the deep neural network based on the features of the corresponding first contour image as inputs;
storing the plurality of second contour images and the corresponding first contour images in the database;
training the neural network based on a first portion of the database, wherein the features of the first contour images are inputs of the neural network and the corresponding second contour images are outputs of the neural network; and
verifying the neural network based on a remaining second portion of the database.

11. The method of claim 8, wherein the integrated circuit for semiconductor device is stored in a graphic design system (GDS) file, and wherein the OPC-ILT-enhanced layout pattern is stored in an adjusted GDS file.

12. The method of claim 8, further comprising:
performing two or more mask projections for each one of the OPC-ILT-enhanced layout patterns to generate two or more corresponding first contour images for each one of the OPC-ILT-enhanced layout patterns, wherein the two or more mask projections are within a process window with different exposure doses and different depth of focus conditions.

13. The method of claim 12, wherein the layout pattern of the integrated circuit comprises a corresponding exposure dose and a corresponding depth of focus for generating the first contour image, the method further comprising:
verifying the corresponding exposure dose and the corresponding depth of focus are within the process window.

14. The method of claim 8, wherein the first contour image and the second contour image are stored in a database in a storage memory.

15. A system for producing a lithographic mask for semiconductor manufacturing, comprising:
an OPC-ILT enhancer module configured to:
receive a first layout pattern corresponding to an integrated circuit;
perform an optical proximity correction (OPC) process to the first layout pattern to produce a first corrected layout pattern;
perform an inverse lithographic technology (ILT) process to the first corrected layout pattern to enhance the first corrected layout pattern to produce a first OPC-ILT-enhanced layout pattern;
generate a first contour image associated with the first OPC-ILT-enhanced layout pattern when the first OPC-ILT-enhanced layout pattern of the lithographic mask is projected on a wafer; and
extract features of the generated first contour image;
a deep neural network configured to:
receive the features of the first contour image as inputs; and
generate a second contour image of a developed photo resist pattern on the wafer corresponding with the OPC-ILT-enhanced layout pattern as an output, wherein the generating the second contour image comprises generating contour biases by the deep neural network based on the features of the first contour image, and applying the contour biases to the first contour image to generate the second contour image; and
a mask verifier module configured to:
inspect the second contour image on the wafer to verify that the second contour image does not have defects.

16. The system of claim 15, wherein the first OPC-ILT-enhanced layout pattern comprises one or more parameters associated with the first OPC-ILT-enhanced layout pattern, and wherein the mask verifier module is further configured to:
verify the one or more parameters are within a process window, wherein the process window comprises a threshold range of radiation energy for generating the second contour image and a depth of focus threshold range for generating the second contour image.

17. The system of claim 15, further comprising:
a storage memory; and
a training module, wherein the training module is configured to:
receive a plurality of first contour images corresponding with projecting the OPC-ILT-enhanced layout patterns on the wafer;
receive a plurality of second contour images, corresponding to the plurality of first contour images, of the developed photo resist patterns on the wafer;
store the plurality of first contour images and the corresponding second contour images in a database in the storage memory;
perform a training of the deep neural network based on a first portion of the database, wherein the features of the first contour images are inputs of the deep neural network and the corresponding second contour images are outputs of the deep neural network; and
perform a verification of the deep neural network based on a remaining second portion of the database.

18. The system of claim 15, further comprising:
a mask design module coupled to the OPC-ILT enhancer module and configured to generate the first OPC-ILT-enhanced layout pattern for the OPC-ILT enhancer module.

19. The system of claim 15, further comprising:
a mask projection system configured to use a radiation source to project the first OPC-ILT-enhanced layout pattern on a mask-blank to produce the lithographic mask.

20. The system of claim 15, wherein the first layout pattern corresponding to the integrated circuit is stored as a graphic design system (GDS) file, and wherein the OPC-ILT-enhanced layout patterns are adjusted GDS files.

* * * * *